(12) United States Patent
Hurst-Hiller et al.

(10) Patent No.: US 7,542,967 B2
(45) Date of Patent: Jun. 2, 2009

(54) SEARCHING AN INDEX OF MEDIA CONTENT

(75) Inventors: Oliver Hurst-Hiller, Seattle, WA (US); Julia Farago, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 280 days.

(21) Appl. No.: 11/170,143

(22) Filed: Jun. 30, 2005

(65) Prior Publication Data

US 2007/0005569 A1    Jan. 4, 2007

(51) Int. Cl.
G06F 17/30    (2006.01)
(52) U.S. Cl. .................. 707/3; 707/4; 704/246; 704/251; 704/277
(58) Field of Classification Search ........... None
See application file for complete search history.

(56) References Cited

U.S. PATENT DOCUMENTS

| | | | | |
|---|---|---|---|---|
| 5,903,892 A * | 5/1999 | Hoffert et al. | ................. | 707/10 |
| 6,314,577 B1 * | 11/2001 | Pocock | ................. | 725/93 |
| 2002/0023272 A1 * | 2/2002 | Pocock | ................. | 725/109 |
| 2005/0120380 A1 * | 6/2005 | Wolfe | ................. | 725/100 |
| 2005/0216443 A1 * | 9/2005 | Morton et al. | ................. | 707/3 |
| 2005/0289168 A1 * | 12/2005 | Green et al. | ................. | 707/101 |
| 2006/0101003 A1 * | 5/2006 | Carson et al. | ................. | 707/3 |

* cited by examiner

Primary Examiner—Wilson Lee
Assistant Examiner—Belinda Xue
(74) Attorney, Agent, or Firm—Shook, Hardy & Bacon L.L.P.

(57) ABSTRACT

A search engine, method and computer-readable medium are disclosed for transmitting requested media content in response to a search request. The search request may include a search term containing text indicative of recorded speech located within the requested media content. The search engine includes an index of media content, including text indicative of recorded speech and a time-based locator corresponding to the location of the text within the media content.

8 Claims, 5 Drawing Sheets

SEARCHING AN INDEX OF MEDIA CONTENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The Internet has become a useful tool over recent years for people to search for various types of information quickly and efficiently. An advantage of the Internet is that one can receive desired content from most parts of the world within just a few moments. Another advantage is that by utilizing one of the many search engines found on the Internet, one can search for desired information with only inputting a small subset of words and phrases. A user is not only looking for textual information on the Internet, but in a lot of cases a user is interested in accessing and downloading various types of media content.

Recorded video content including television shows, television programs, television broadcasts, and movies are examples of media content that people may be interested in searching for. However, there is not yet any technology that allows one to search for, find, and listen to or view these types of media content on demand over the Internet. For example, if a person wanted to watch a TV show that he may have missed some weeks ago and could only remember one line that was said when he saw it on a preview, it would almost be impossible for him to see that show within moments on demand. The person may not know the exact name of the episode, the exact day the episode was aired on, and may not even know what the main course of events that took place in the episode were. So even if it were possible for the person to order and purchase the episode, maybe from the network that aired the episode, that person would have very little information to describe the desired episode to a representative of the network. Even if the representative could decipher which particular episode the person wanted, the time it would take for the person to actually receive the episode from the network may take days or weeks, or even worse, the person would have to wait months or years until that particular show was aired again.

SUMMARY

The present invention is directed to a search engine and method for transmitting media content in response to a search request. The search engine includes a communication interface for receiving a search request from a requester and for transmitting at least one search result to the requester. The search engine also includes an index of media content. The index includes text indicative of recorded speech and a time-based locator corresponding to the location of the text within the media content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
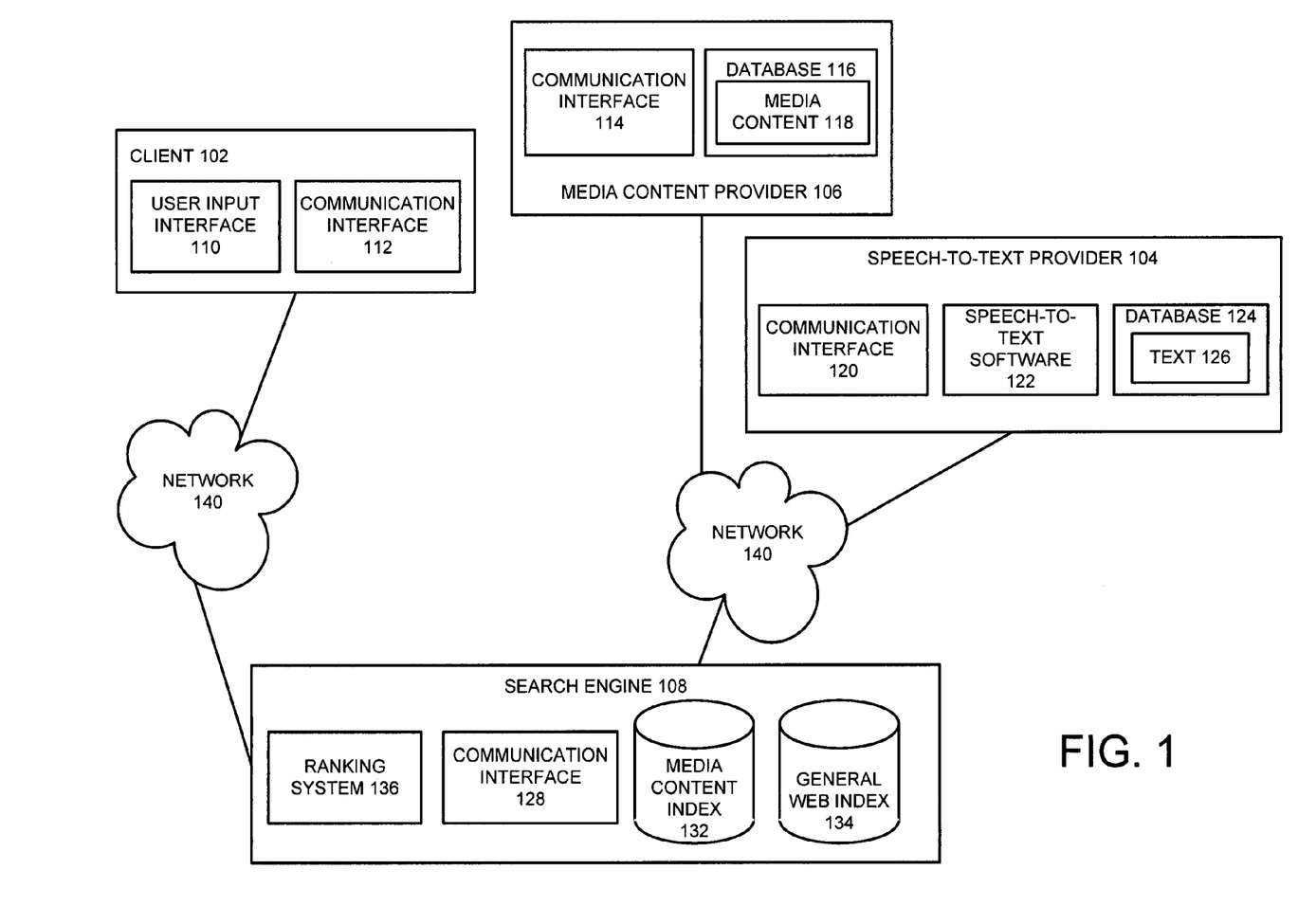
FIG. 1 illustrates an exemplary embodiment for a system of the present invention.

FIG. 1 illustrates an exemplary embodiment for a system 100 of the present invention. System 100 may includes computer-readable storage medium and components such as a client 102, a speech-to-text provider 104, a media content provider 106, and a search engine 108. Client 102, speech-to-text provider 104, media content provider 106, and search engine 108 can each have a communication interface, 110, 114, 120, 128, respectively, for communicating information between one another via a network 140. As shown in FIG. 1, the search engine 108 may use the same network 140 to communicate with the client 102 and to communicate with the other components, or the search engine 108 may use different networks 140 to communicate with the various components. In an embodiment, the components can connect to each other via a wireless interface. Network 140 may be or can include the Internet. Components 104, 106, and 108 can be separate components, as shown in FIG. 1, or at least two of the components can be incorporated into a single component. For example, speech-to-text provider 104 and media content provider 106 can be incorporated into one single component, and alternatively, all three components can be incorporated into one single component.

Client 102 may be or include a desktop or laptop computer, a network-enabled cellular telephone, wireless email client, or other client, machine or device to perform various tasks including Web browsing, search, electronic mail (email) and other tasks, applications and functions. Client 102 may also include user input interface 110 for allowing a user of the client 102 to input and transmit search requests to search engine 108, among other information, across network 104. Search requests can include a user of a client 102 inputting search terms, to be sent to a search engine 108, for information on how to view or listen to a particular media content on demand at the client. Media content can include recorded television (TV) shows, programs, and broadcasts, recorded movies, recorded music, recorded speeches and lectures, or any other media content that can store recorded speech.

Media content provider 106 may be or can include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Media content provider can include a database 116 for storing media content 118 including audio and video content. For example, media content provider can store media content 118 such as audio and video content including recorded television (TV) shows, programs, and broadcasts, recorded movies, recorded music, recorded speeches and lectures, or any other media content that can store recorded speech. Media content provider 106 can also include a search engine in cases where a search engine can index media content. Media content provider 106 can transmit media content across network 140 via communication interface 114.

Speech-to-text provider 104 may be or include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Speech-to-text provider may additionally include speech-to-text software 122 for converting recorded speech on any type of media content, such as audio and video content including recorded TV shows, programs, and broadcasts, recorded movies, recorded music, recorded speeches and lectures, or any other recorded speech found on media content, into text 126. In another embodiment, speech-to-text provider can manually convert recorded speech found on various types of media content into text, such as by manually translating speech into text for closed captioning purposes. Speech-to-text provider 104 can receive media content with recorded speech 118 from media content provider 106 by utilizing communication interface 120. Once the media content 118 is received, speech-to-text provider can utilize speech-to-text software 122 to convert the recorded speech into text 126. Once the recorded speech is converted to text 126, the speech-to-text provider can store the text 126 in a database 124.

Search engine 108 can be or include a server including, for instance, a workstation running the Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform. Search engine 108 can be configured to receive a search request from a client 102, and can return a search result corresponding to the search request back to the client. The search result can include a reference pointing to a media content provider 106 that the client 102 can use to access requested media content. Search engine 106 can also include a media content provider in cases where the search engine can index media content. Search engine can receive text from speech-to-text provider 104 and can generate a media content index 132 specifically designed to store the text received from the speech-to-text provider 104. In another embodiment, media content index 132 can include other textual descriptive information in addition to the text corresponding to the speech from the media content. For example, the media content index 132 can also store information describing the media content that does not include speech. Such information can include names of characters in media content, sounds that were made in the media content, descriptions of visual locations within the media content, and any other descriptive information related to the media content. The media content index 132 can allow the search engine 108 to efficiently search for relevant search results corresponding to a request from a client. Media content index 132 can be a separate index from a general web index 134 of search engine 108. The general web index 134 can be configured to index all other information found on the Internet. In another embodiment, search engine 108 can integrate the text 126 received from speech-to-text provider 104 into the general web index 134 instead of creating a separate media content index 132. The search engine can additionally include a ranking system 136. The ranking system 136 can include a static ranking system or a dynamic ranking system.

Figure 2:
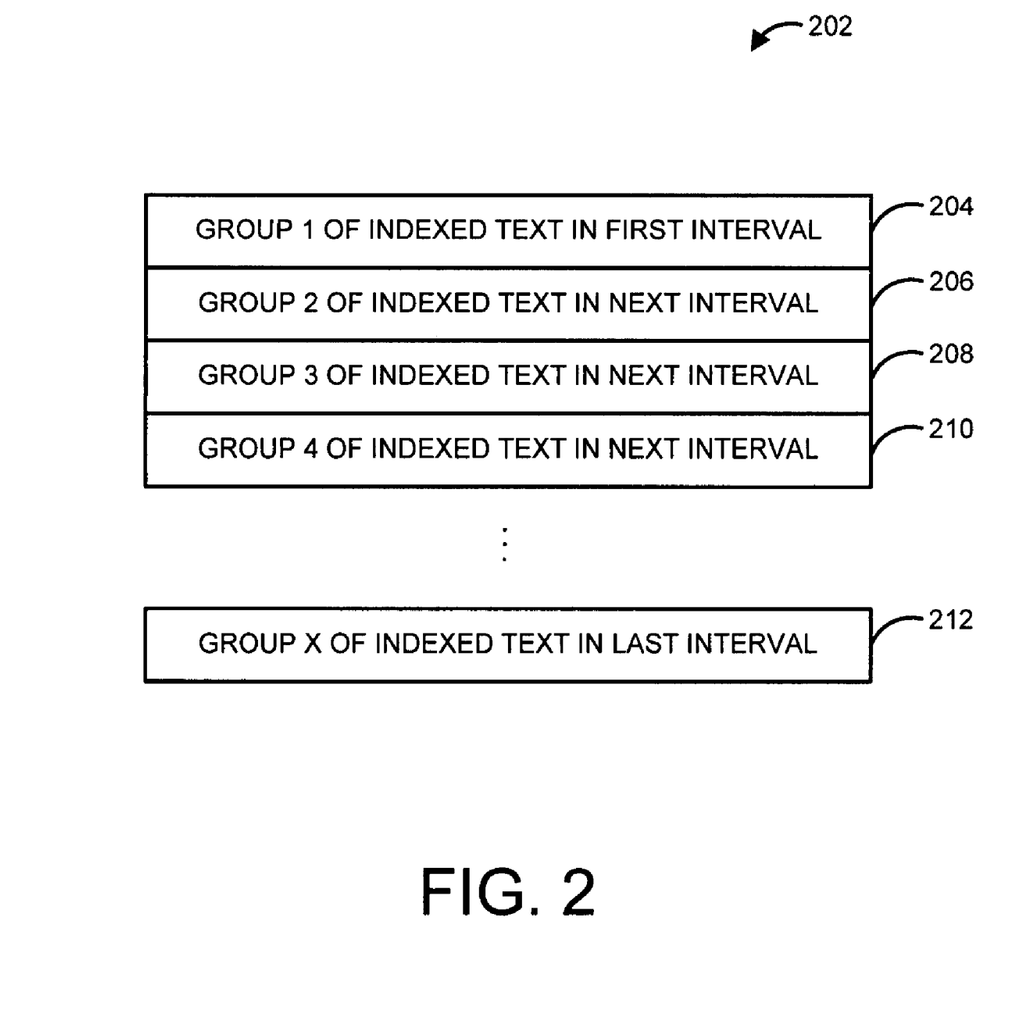
FIG. 2 illustrates an embodiment for creating a media content index for the present invention.

FIG. 2 illustrates an embodiment for creating a media content index for the present invention. When creating the media content index, a search engine can associate the indexed text corresponding to media content in a similar fashion as current search engines can create a general web index by indexing text with a Uniform Resource Locator (URL) that a source document corresponding to the text is located. Similar to creating a general web index in which the search engine can create a document-based locator associated with each word corresponding to where the word appears in the document, in creating a media content index, a search engine can record a time-based locator corresponding to where in the media content each word appears. For instance, FIG. 2 shows an example of how media content 202 can be indexed. Media content 202 can be, for example, a recorded TV show. "Group 1" 204 for example, can be a first group of indexed text from the first time interval of the media content 202. For example, "Group 1" 204 can be a set of text found in the first number of seconds, minutes, hours, etc. of whatever the length of time the time interval is. The time interval can be any amount of time predetermined and designated by the search engine. For example, the time interval can be 10 seconds, 20 seconds, one minute, two minutes, etc. However, it may advantageous to have a relatively short time interval, less than one minute for example, in order to present a search result to the client 102 that can be presented at the moment in which search terms occurred within the media content. For example, if a user of a client inputs the terms "are you not entertained, is this not why you are here?" it would be desirable to transmit a reference, such as a hyperlink, back to the user that can present the particular media content to the user at the exact point in the media content in which the search term was said. If relatively short time intervals are used, it can be easier to narrow-down the words to a specific group that can be presented to the user in which the user can quickly view or listen to the desired media content that corresponds to the time in which the search terms were said. However, if the search engine is programmed to include relatively long time intervals, time intervals greater than five minutes for example, it may be difficult to pinpoint a place within a group of five or more minutes worth of text that the specific search terms can be found. The search terms may actually end up being located at the very end of the group of text in which the user may have to watch or listen to the five or more minutes of media content before the user can actually watch or listen to the part of the media content in which the search terms were said. But again, the search engine can be programmed to include any time interval that is desired.

Groups 2-4, 206, 208, and 210 respectively, can include the indexed text for subsequent time intervals. The time intervals can again be of any duration of time desired by a search engine. Time intervals for Groups 1-4 can be the same, or at least one group of text can include a different time interval. Group "X" 212 can represent the last group of indexed text of media content 202. "X" can represent any number of groups that can be created to divide media content 202 into groups of indexed text.

Figure 3:
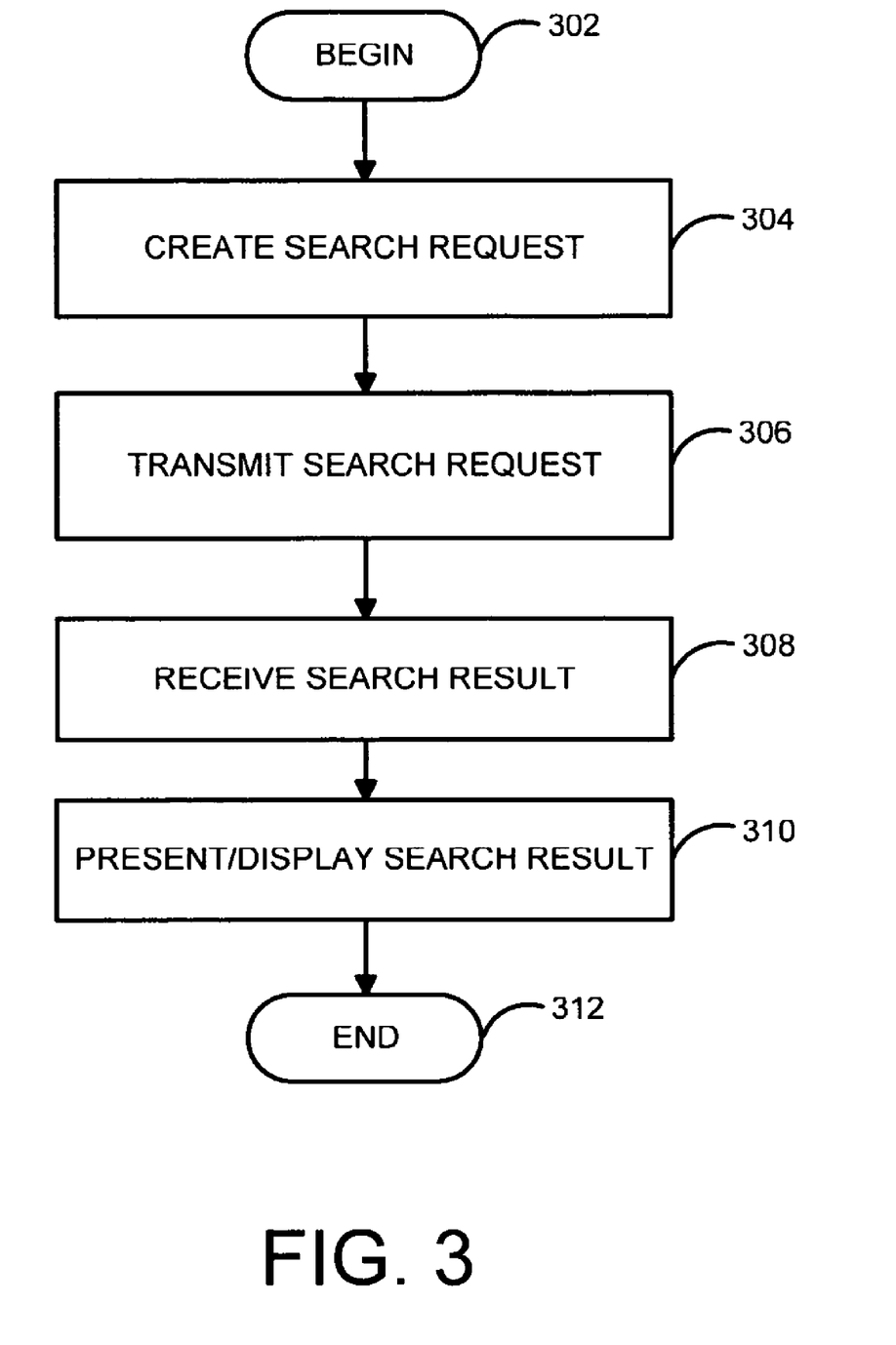
FIG. 3 illustrates an exemplary method for requesting media content in an embodiment for the present invention.

FIG. 3 illustrates a method for requesting media content. A client 102 can first request media content by creating 304 a search request. In creating a search request, the client can connect to a search engine and can input search terms relating to the desired media content. The search terms can be, for example, speech that was said within the desired media content. Once the search terms have been generated, the client can transmit 306 the search terms as a search request to the search engine via a communication interface within the client. The client can subsequently receive 308 a search result from the search engine once the search engine retrieves the search result. Again, the search result can include a reference pointing to a location of a media content provider 106 that the client 102 can use to access the requested media content. In an embodiment wherein a search engine indexes the actual media content, the search engine can be considered as a media content provider. Once the search result is received, the media content can be presented or displayed 310 to a user of the client. The media content can be presented to the user through a media player that can be installed on the client. For example, in the case of the search result including a reference to a media content provider, when the user accesses the reference, a media player can appear on the client so that the media player can play the media content from the media content provider that the reference points to. Again, a media content provider can include a search engine in cases where the search engine indexes the actual media content. In an embodiment, the reference can point to a location that closely matches the moment in which the speech corresponding to the original search terms was said. In another embodiment, the reference can point to a location that matches the exact moment in which the speech corresponding to the original search terms was said.

Figure 4:
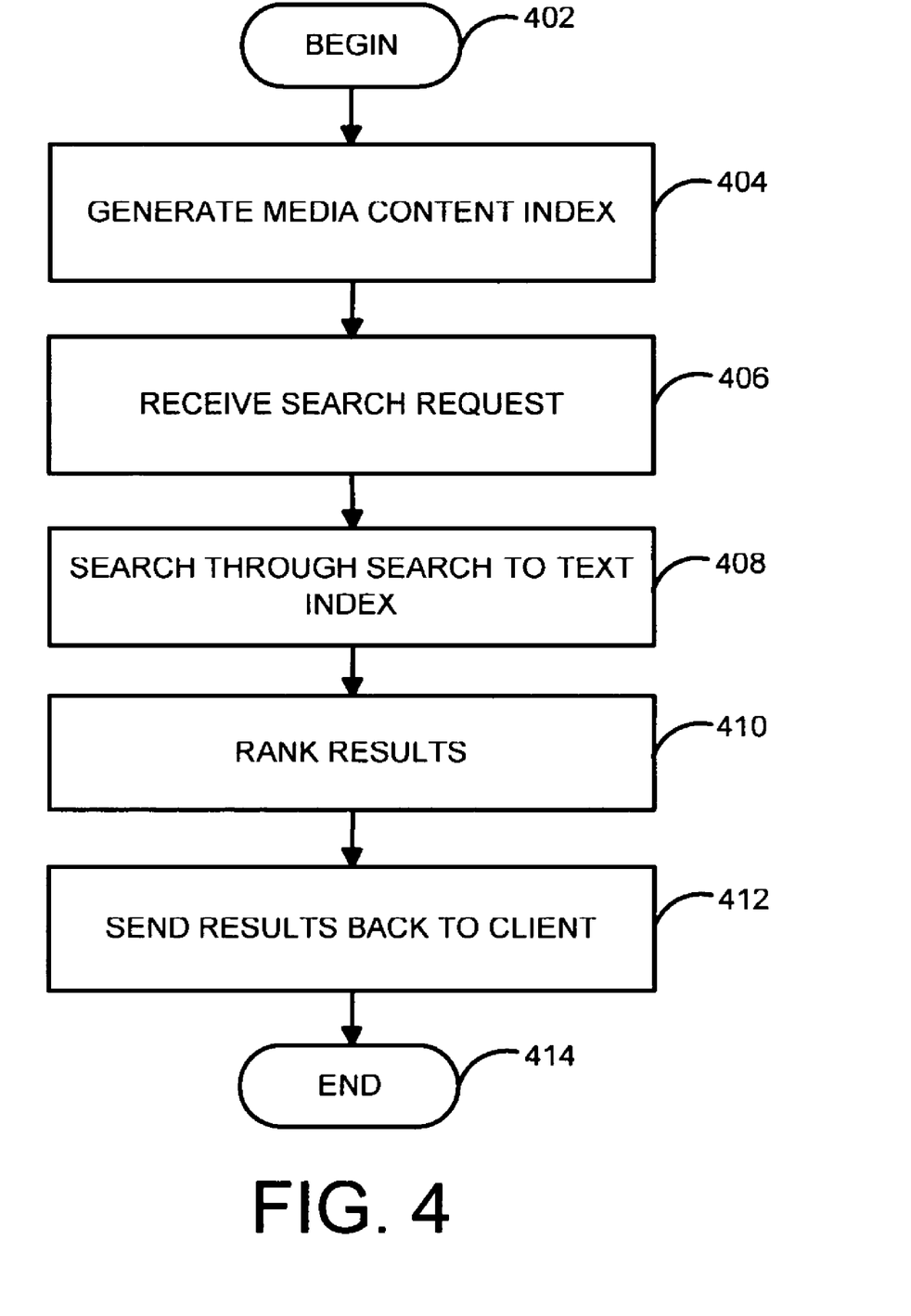
FIG. 4 illustrates an exemplary method for a search engine responding to a search request generated by a client for an embodiment of the present invention.

FIG. 4 illustrates a method for a search engine responding to a search request generated by a client. A search engine can first generate 404 a media content index that the search engine can use to search for speech that was said within different types of media content. A process for creating a media content index can be similar to a procedure outlined in FIG. 2. More specifically, when creating the media content index, a search engine can associate the indexed text corresponding to media content in a similar fashion as current search engines can create a general web index by indexing text with a Uniform Resource Locator (URL) that a source document corresponding to the text is located. Similar to creating a general web index in which the search engine can create a document-based locator associated with each word corresponding to where the word appears in the document, in creating a media content index, a search engine can record a time-based locator corresponding to where in the media content each word appears. Once the media content index has been created, the index can be periodically updated when subsequent media content has its recorded speech converted to text.

Once the media content index has been generated, the search engine can then be configured to receive 406 search requests pertaining to media content desired by any number of clients. In order to fulfill a request from a client, the search engine can search through the generated media content index to find relevant search results that correspond to the search terms. Again, the search terms can be, for example, speech that was recorded within the desired media content, and the search result can include a reference pointing to a location of a media content provider that the client can use to access requested media content.

Once the search engine has compiled a list of relevant search results, the search engine can then rank 410 the search results in a order of relevance. The search engine can rank the results by using a static ranking system or a dynamic ranking system. The static ranking system can include a pre-ranking system, independent of the search terms within a search request, that can rank the results from a particular source. For example, in a case in which a client is searching for dialogue recorded within a TV show, the search engine can rank the results based on the ratings of the TV shows that appear in the search result. The dynamic ranking system, for example, can be dependent on the search terms within a search request. The dynamic ranking system can be based on the number of times a particular set of search terms within a search request appears in an item of media content. Once the search results have been ranked, the search engine can send 412 the search results back to the client.

Many other alternative embodiments are contemplated by the present invention. In one embodiment, the search engine can add references to particular search results that may mention other media content. For example, some TV shows may mention other TV shows, programs, and broadcasts. The search engine can be adapted to include a reference to the other TV show that is mentioned in the particular search result. In another embodiment, the search engine can include a reference, accompanied with the search result, to allow a user of a client to search through a general web index for results corresponding search terms from an original request of the user. In such an embodiment, the search engine can also create and include a reference, accompanied with search results from a search related to the general web index, that can allow the user to search through the media content index with the search terms corresponding to the search terms used to search the general web index.

In another embodiment, a search engine and media content provider can allow only a predetermined time interval of a requested media content to be presented to a client. With reference to FIG. 2, the search engine and media content provider may only allow a time interval of a group of indexed text to be played to the user of the client. In another embodiment, the user can watch or listen to the entire media content 202, however, playback of the content can begin at the time interval the search terms happen to be located in. In yet another embodiment, the user may have to pay for the rights to watch or listen to any time interval of media content or for the entire media content.

In an embodiment, a search engine can be adapted to translate search terms into different languages and can create a media content index that can include multiple languages. In another embodiment, in cases where search terms may appear more than once in a given media content, the search engine can be programmed to default to show the interval of content that occurs first in the media content.

Figure 5:
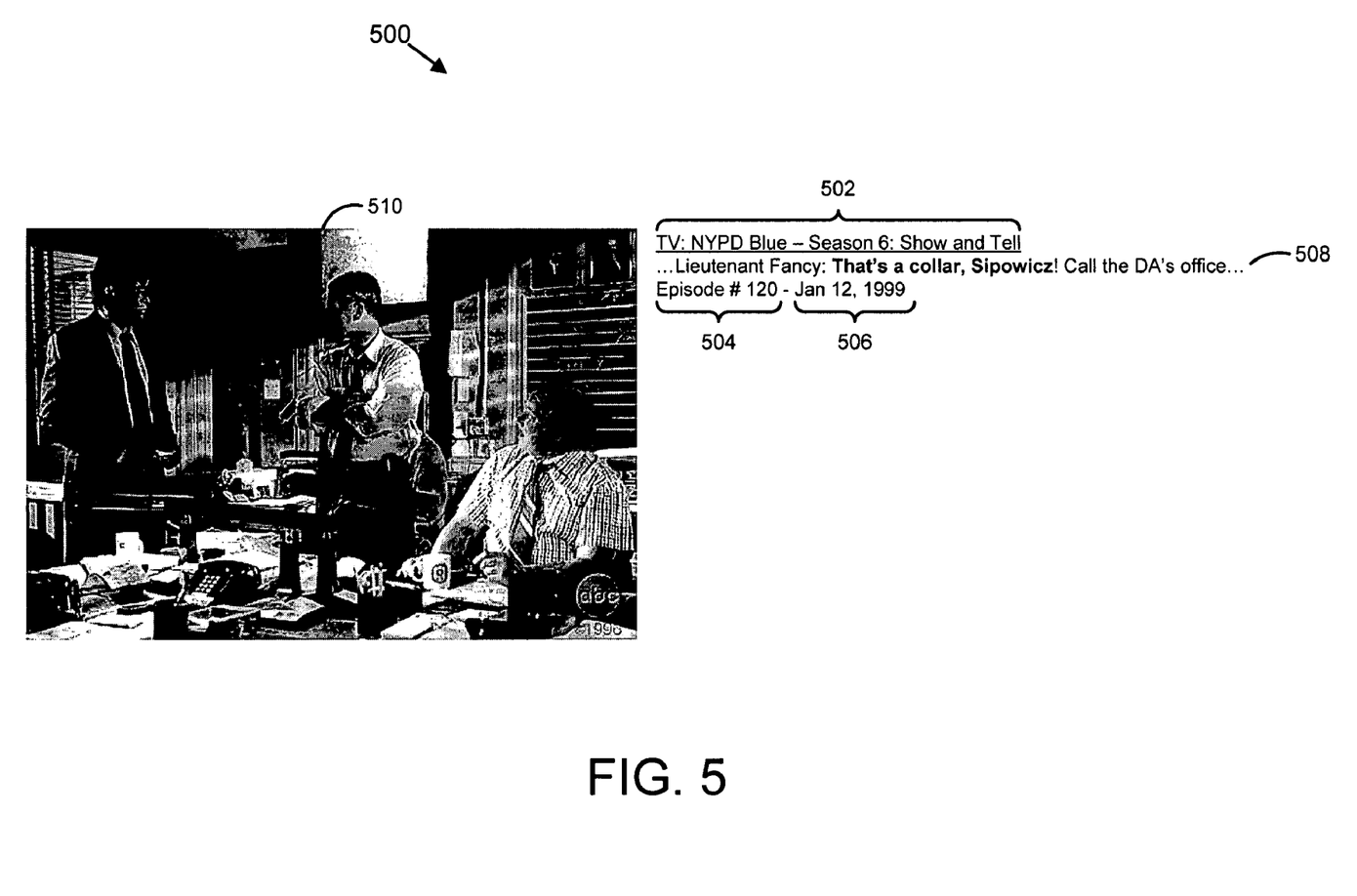
FIG. 5 illustrates an embodiment for presenting a search result to a client.

FIG. 5 illustrates an embodiment for presenting a search result to a client. Search result 500 can be a search result corresponding to an original search request including the search terms "That's a collar, Sipowicz." Section 502 can include an active reference, a hyperlink for example, to playback media content corresponding the search result. Again, the playback can commence at the beginning of the time interval the search terms appear in within a media content index. Section 504 can include a numeric identifier of the media content. For example, section 504 can include an episode number, a song track number, and a time reference that corresponds to a time in which the search result appears within the media content. Section 506 can include the original date that the media content was released. For example, section 506 can include the date a TV show was originally aired, a date in which a movie was originally released in theaters, and a date when a song on an album was originally released. Section 508 can include snippets of the search terms that match text from an indexed transcript of the media content, including surrounding excerpted text to put the matching text in context. Section 510 can include a thumbnail image relating to the media content. The thumbnail image can include the TV show's or movie's logo, an album cover, and a still frame image or a motion video image from the moment the matching text from the search terms occurred within the media content.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

We claim:

1. A computer-readable storage medium having computer-useable instructions stored thereon for performing a method for transmitting requested media content to a requester, the method comprising:

converting recorded speech contained within media content to text to create converted text indicative of the recorded speech, wherein the media content is maintained by a media content provider not associated with a search engine;

indexing the media content by recording at least one time-based locator corresponding to a location of the converted text within the media content, wherein the at least one time-based locator includes one or more time intervals for grouping the converted text indicative of recorded speech within the media content;

integrating the converted text into a general web index to create an integrated index, wherein the general web index comprises at least one document-based locator corresponding to a location of indexed text in a source document, and wherein the source document does not include the media content;

receiving a search request for requested media content from a requester, wherein the search request includes at least one search term containing text indicative of recorded speech located within the requested media content, wherein the at least one search term is associated with a first language;

translating the at least one search term into a second language;

searching the integrated index for media content containing the at least one search item to identify a first search result, wherein the first search result comprises at least one reference corresponding to media content that is identified in the requested media content;

ranking the first search result according to a level of relevance with respect to the search request;

searching the integrated index for at least one source document containing the at least one search term to identify a second search result, wherein the second search result comprises at least one uniform resource locator (URL) corresponding to the at least one source document;

determining a level of relevance and ranking the first and second search results by using at least one of a static ranking system and a dynamic ranking system, the static ranking system comprising a pre-ranking system that ranks results from a particular source, wherein the static ranking system is independent of search terms within the search request; and transmitting the first and second search results to the requester.

2. The computer-readable storage medium according to claim 1, wherein the at least one search result includes a reference that points to a location of a media content provider that stores the media content.

3. The computer-readable storage medium according to claim 1, wherein the media content includes at least one of audio content and video content.

4. The computer-readable storage medium according to claim 1, wherein the method further comprises including a reference within at least one search result, the reference pointing to the location of the at least one search term within the media content.

5. The computer-readable storage medium according to claim 4, wherein the at least one search result includes a thumbnail of at least one of a still frame image and a motion video image.

6. A computer-implemented method for using a search engine to identify and transmit requested media content to a requester, comprising:

using a computer to convert recorded speech;

converting the recorded speech contained within media content to text to create converted text indicative of the recorded speech, wherein the media content is maintained by a media content provider not associated with the search engine;

indexing the media content by recording at least one time-based locator corresponding to a location of the converted text within the media content, wherein the at least one time-based locator includes one or more time intervals for grouping the converted text indicative of recorded speech within the media content;

integrating the converted text into a general web index to create an integrated index, wherein the general web index comprises at least one document-based locator corresponding to location of indexed text in a source document, and wherein the source document does not include the media content;

receiving a search request for requested media content from a requester, wherein the search request includes at least one search term containing converted text indicative of recorded speech located within the requested media content, wherein the at least one search term is associated with a first language;

translating the at least one search term into a second language;

searching the integrated index for media content containing the at least one search item to identify a first search result, wherein the first search result comprises at least one reference corresponding to media content that is identified in the requested media content;

ranking the first search result according to a level of relevance with respect to the search request;

searching the integrated index for at least one source document containing the at least one search term to identify a second search result, wherein the second search result comprises at least one uniform resource locator (URL) corresponding to the at least one source document;

determining a level of relevance and ranking the first and second search results by using at least one of a static ranking system and a dynamic ranking system, the static ranking system comprising a pre-ranking system that ranks results from a particular source, wherein the static ranking system is independent of search terms within the search request; and transmitting the first and second search results to the requester.

7. The method according to claim 6, wherein the media content includes at least one of audio content and video content.

8. The method according to claim 6, further comprising including a reference within the first search result, the reference pointing to the location of the at least one search term within the media content.

* * * * *